Feb. 23, 1965 W. W. RICHMOND ETAL 3,170,227
METHOD OF FABRICATING CLAD TUBES
Original Filed June 27, 1960 2 Sheets-Sheet 2
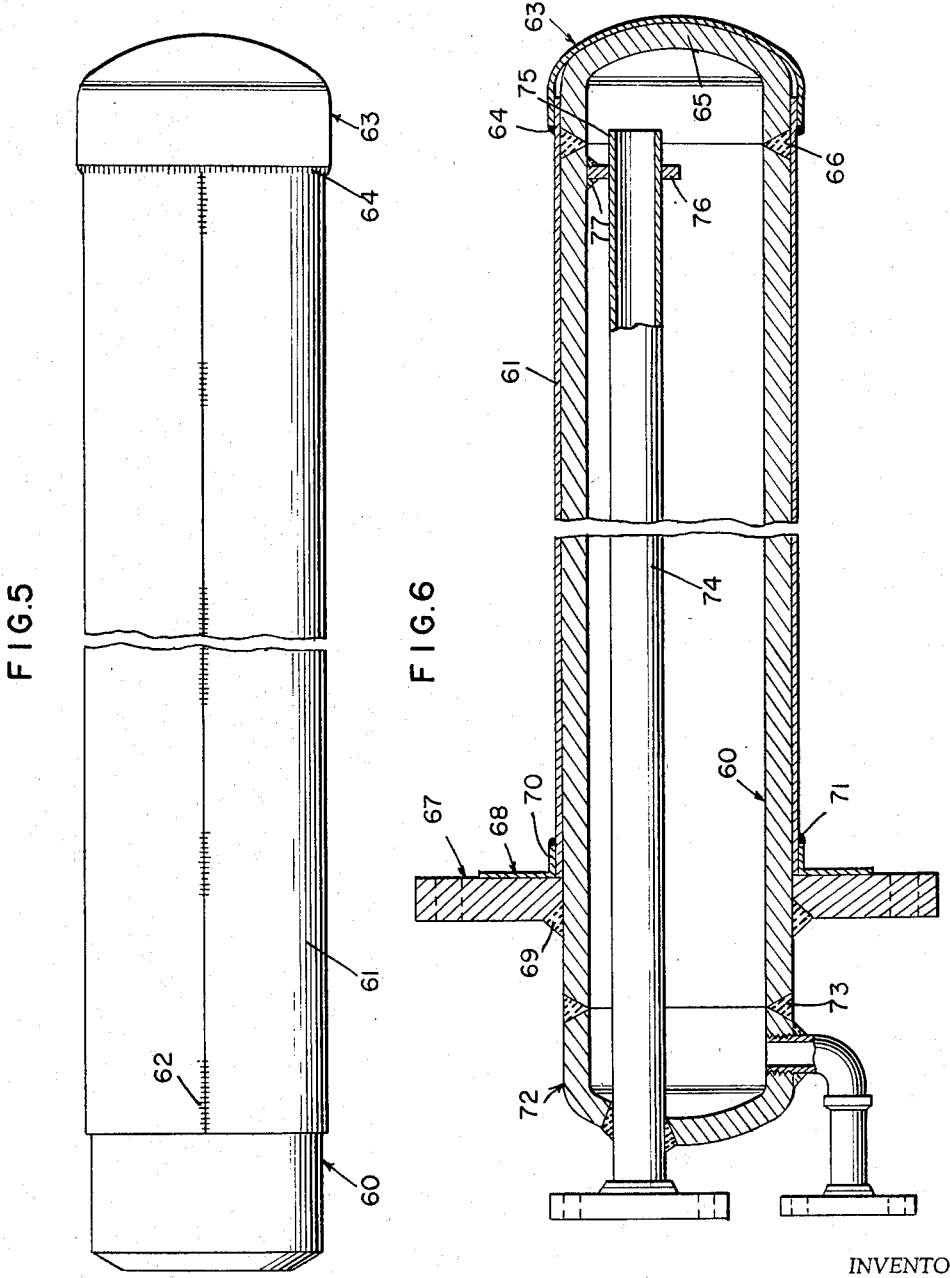
INVENTORS
Ernest Mantius
William W. Richmond
BY Charles F. Kaegebehn
ATTORNEY

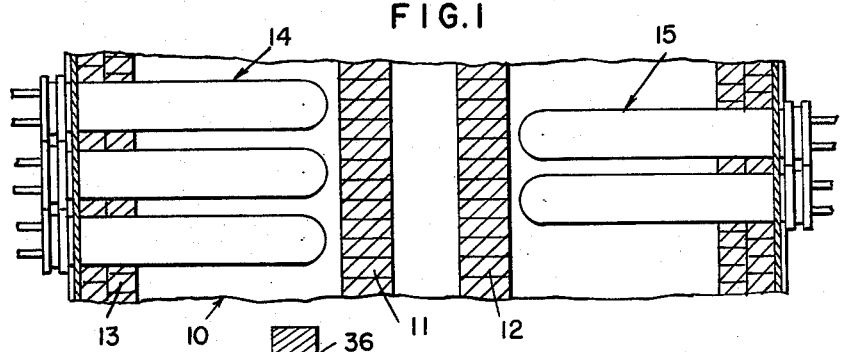
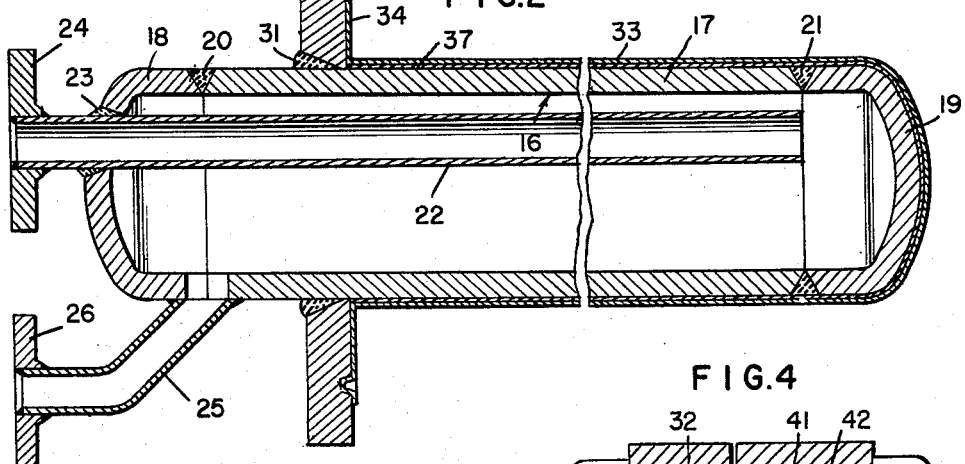
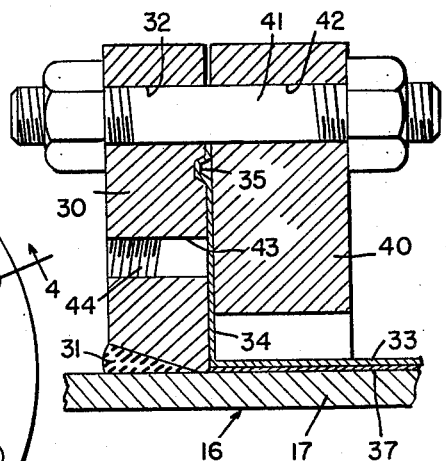
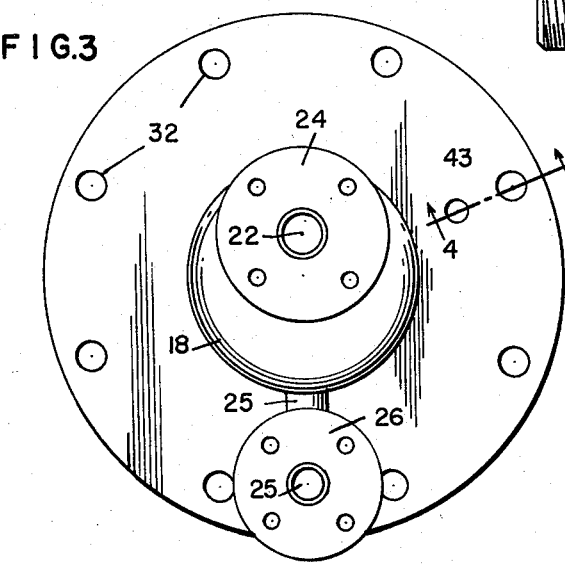
INVENTORS
Ernest Mantius
BY William W. Richmond
ATTY.

3,170,227
METHOD OF FABRICATING CLAD TUBES
William W. Richmond, Huntington, and Ernest Mantius, New York, N.Y., assignors to National Lead Company, New York, N.Y., a corporation of New Jersey
Original application June 27, 1960, Ser. No. 38,992. Divided and this application Feb. 3, 1961, Ser. No. 94,105
7 Claims. (Cl. 29—157.3)

The present application is a division of U.S. patent application Serial No. 38,992, filed June 27, 1960, now abandoned.

This invention pertains to the construction of heating tubes useful in acid concentrators and the like and is directed more particularly to certain improvements therein for permitting greater efficiency in the operation of the associated concentrator or other apparatus, while at the same time imparting longer life to the heating tube itself.

For the sake of brevity the description herein will be limited to heating tubes as constructed and employed in acid concentrators. It is to be recognized, however, that the invention as hereinafter disclosed and claimed is equally applicable to other liquids and forms of equipment such as heating and cooling pots, open kettles, other forms of evaporators, etc.

Certain types of acid concentrators utilize heating tubes which are projected into the interior of the concentrator containing the acid. Naturally, for greater thermal efficiency, it is desirable to use a reasonably high steam pressure and, consequently, high temperature in the tubes to heat the acid. However, certain limitations are imposed in view of the fact that the heating tubes are directly in contact with the acid and hence are subject to considerable corrosion. In the past, attempts to overcome the corrosion effect have, unfortunately, introduced other factors substantially as detrimental as the corrosion itself. For example, high silicon iron tubes have been used (14.4% Si, balance essentially Fe) and although this type of tube resists corrosion very well, tubes cast from such material are brittle and easily fractured either by mechanical damage in handling or thermal shock in use. Furthermore, this type of tube is not of unusually great strength and maximum steam pressure is limited for practical purposes to about 150 p.s.i. (365° F.). Corrosion is low but considerable fouling occurs and repair of broken tubes is not practical and when once damaged, a tube is completely lost. Still further, in view of the fact that the material is not of great strength, heavy wall thicknesses are required, in the order of three-fourths of an inch, which, of course, is detrimental to good heat transfer characteristics. Other alloys have been used, notably alloys of the type containing 85% Ni, 10% Si, with the balance substantially Cu, Al, etc., tubes made from such alloys being less brittle than the high silicon iron type and also being characterized by permitting some repairs to be made in the case of tube damage. However, such tubes are subject to considerably more corrosion than the high silicon iron type. Steam pressure used with such type of tubes is usually in the range of about 300 p.s.i. (420° F.) so that the amount of heat transferred is improved. In addition to the normal corrosion effect, these alloys have a definite critical range in which the corrosion is materially accelerated. That is to say, with a sulfuric acid concentration of from 55% to 65%, these alloys cannot be economically used in view of the extremely rapid corrosion which takes place within this range. Also, tubes fabricated entirely from tantalum have been used but due to the expense of the material involved, the wall thicknesses are necessarily kept rather small, in the order of .015 inch and for this reason, damage to the tubes easily occurs from mishandling or mechanical rupturing and the like. A maximum allowable steam pressure with a tantalum tube of this type is usually about 150 p.s.i. higher steam pressures being possible by increasing the wall thickness but being uneconomical due to the high cost of the tantalum.

In the present invention, a heating tube is formed from a core of mild steel or other suitable material having sufficient strength to withstand steam pressures of 300 p.s.i. or higher and which core is sufficiently strong to withstand thermal shock as well as mechanical shock and wherein there is intimately bonded to the outer surface of this core a thin walled tantalum tube which renders the tube corrosion resistant and anti-fouling while retaining good heat transfer characteristics.

While this description of the invention is primarily concerned with the use of a mild steel core, it should be understood that the core tube may be made of other materials for example copper, nickel, titanium, etc. The employment of mild steel, however, is obviously economical and in most instances desirable as is hereinafter more fully set forth.

More particularly, the present invention contemplates the use of a relatively thick walled mild steel tubular core which is coated, for example, by spraying or plating with a metallic bonding medium such as for example a brazing compound to a suitable thickness, say about 0.001 to about 0.006 inch whereafter a preformed tantalum tube is slipped over this core and with the tantalum tube and steel core being rigidly held together in a special fixture is furnace brazed to effect a good bond between the tantalum tube and the mild steel core. The tantalum tube is provided with a flange mating with a corresponding flange on the steel core and by means of which the two tubes are rigidly held together during the furnace brazing operation and there further being means to exhaust air from between the tantalum tube and the steel tubular core while the same are being furnace brazed.

Perhaps at this point it should be emphasized that a high degree of vacuum is required to insure the minimum presence of oxygen. At the brazing temperatures herein contemplated the tantalum will tend to be oxidized unless adequate provisions to prevent same are maintained. Of course replacement of any oxygen with an inert gas is helpful in this respect.

A further object of this invention resides in the method of fabricating a clad tube in which tantalum sheet is wrapped about a tube section and welded into cylindrical form while wrapped about the section, the tantalum sheet then being removed from the section and a metallic bonding medium such as copper or copper alloy in the order of 0.001 to 0.006 inch in thickness being applied to the tube, the tantalum sheet then being re-assembled over the tube section and the two inserted in a vacuum furnace at a temperature in the order of 2000° F. to effect a bond. In this manner, the bond between the tantalum and the steel tube section is very effectively achieved by virtue of the fact that the coefficient of thermal expansion for steel is nearly twice that for tantalum so that as the two are heated in the brazing furnace, the tantalum will be held tightly in compression on the steel tube section, the brazing material solidifying, during the cooling period, while the tantalum is still in compression on the steel, thus effecting a very efficient bond between the two. As mentioned before at such furnace temperatures it is important to keep air or oxygen away from the tantalum.

In the drawings:

FIG. 1 is a section, taken through a portion of a typical acid concentrator, showing several tubes operatively positioned therein;

FIG. 2 is a longitudinal section taken through one of the heating tube assemblies constructed in accordance with this invention;

FIG. 3 is an end elevational view of the assembly shown in FIG. 2;

FIG. 4 is an enlarged section taken through a portion of the heating tube and illustrating the manner in which the tantalum cladding is held in place on the tube on the steel core during the furnace brazing operation;

FIG. 5 is a plan view showing a modified method of cladding and illustrating the initial step thereof; and FIG. 6 is a longitudinal section taken through one of the tube assemblies fabricated in accordance with the modified method.

Referring now more particularly to FIG. 1, a portion of the acid concentrator is indicated therein generally by the reference character 10 and will be seen to include inner wall portions 11 and 12 and an outer wall 13 provided with openings therein through which project a plurality of heating tubes such as those indicated by the reference characters 14 and 15. In the operation of the concentrator, the dilute acid is introduced into the concentrator and covers the tubes 14 and 15 and these tubes are heated by means of pressurized steam or other heating media so as to heat the dilute acid during the concentrating process until such time as a predetermined acid concentration has been achieved, as necessitated by its ultimate use.

As shown more clearly in FIG. 2, a heating tube constructed in accordance with this invention typically consists of a mild steel tubular core indicated generally by the reference character 16 and being constructed preferably of an elongated tubular length 17 of such material and being provided with caps 18 and 19 at its opposite ends which are affixed and sealed to the main section 17 by means of the welds 20 and 21. A steam or other heat containing media inlet line 22 is projected into the interior of the core 16 through the end cap 18, the inlet tube being rigidly fixed to the core by means of the weld 23. The inlet tube 22 is provided with a flange 24 at its outer end so that the same may be detachably secured to a source of steam under pressure. For returning the steam condensate, there is a condensate line 25 projecting angularly downwardly from the bottom of the core 16 and being provided with a securing flange 26 at its free end as shown for connection to a condensate return line in the steam supply system.

Fixed to the main section 17 of the core 16 adjacent the cap 18 is an annular collar 30 which is rigidly secured to the core by means of the weld 31 and which collar, as can be seen best in FIG. 3, is provided with a plurality of circumfernetially spaced openings 32 whereby the tube assembly is detachably secured in proper position in association with a concentrator such as that indicated by the reference character 10 in FIG. 1.

Surrounding the steel core 16 is a tantalum tube 33 which is provided with a flange 34 at one end abutting the collar 30 and having a raised circumferential rib 35 thereon projecting into a corresponding circumferential groove in the face 36 of collar 30, effecting a seal between the flange 34 and collar 30.

The tantalum tube 33 is bonded firmly and securely to the steel core 16 by means of an intermediate layer of brazing compound 37. Preferably, the tantalum tube is formed from sheet stock and is relatively thin, preferably in the order of 0.008–0.015 inch in thickness. The bonding material 37 is, on the other hand, of a thickness in the order of about 0.001 to about 0.006 inch.

In manufacturing the tubes, the steel core assembly, after fabrication, typically has a layer of brazing compound sprayed or otherwise applied over the surface thereof beyond the collar 30 and then the preformed tantalum tube and flange are slipped over the core to bring the flange 34 thereof up against the collar 30. At this point, an annular collar 40, see FIG. 4, is positioned against the flange 34 and secured clampingly to the collar 30 by means of a series of studs or bolts 41 which pass through suitable openings 42 in the collar 40 and the openings 32 in the collar 30, substantially as shown. From FIG. 4, it will also be noted that at least one point in the collar 30, there is provided an exhaust port 43 which projects through a collar 30 and may be internally threaded in one portion 44 thereof for connection to an exhaust line. When the clamping collar 40 is in place as shown in FIG. 4, the assembly is introduced into a brazing furnace where the temperature of the assembly is typically elevated to the order of 2000° F. for example when copper is employed, for a period of time so that the brazing compound may fuse and firmly unite the tantalum tube 33 to the core 16. At the same time, a vacuum is maintained in the exhaust port 43 to exhaust any air or fumes accumulating between the steel tube and the tantalum tube during the brazing operation. After the brazing operation, the tube assembly is permitted to cool and clamping collar 40 is removed and the net result is a tantalum clad mild steel tube having material strength without being brittle and having, by virtue of its tantalum cladding, a high resistance to corrosion as well as fouling and while still retaining excellent heat transfer characteristics.

The rib 35 and the cooperating groove in the portion 30 which receives such rib as well as the rib on the collar 40 which serves to hold the rib 35 in place cooperate together to form an air-tight seal extending circumferentially completely around the flange 34 as will be clear from FIG. 4 of the drawings so as to provide a seal in this region. In this way, it will be assured that there will be no leakage exteriorly past this rib when negative pressure is introduced through the port 43 and hence the negative pressure thus introduced will be fully effective to assure the withdrawal of air, fumes and other gaseous products during the furnace brazing operation. This is an important consideration inasmuch as it is essential to provide as good a bond between the tube 33 and the core which it surrounds as is possible in order that the heat transfer characteristics will be of the best obtainable.

It is to be noted that by the specific process and assembly disclosed herein, a very thin tantalum tube is utilized. When using tantalum tubing, without the metallic core, the thickness of the tantalum must be increased as the diameter of the tube and/or the internal steam pressure is increased, whereas in our specific process the thickness of the tantalum remains the same under all conditions. Since the cost of tantalum sheet from which the tubes are normally fabricated is about $70.00 per pound, it will be readily appreciated that the instant process and construction represents a material saving in cost while at the same time, the instant assembly is also able to withstand much greater steam pressures than tantalum tubing alone and is not subject to as great a degree of mechanical damage as the tantalum tubing alone.

Referring at this time more particularly to FIG. 5, a modified method of fabrication is illustrated. In this figure, reference character 60 illustrates a steel tube section which is utilized in this instance as a welding jig. This tube section operates to act as a form about which a sheet 61 of tantalum is wrapped, with the longitudinal edges thereof in abutting or slightly overlapping relation and while held firmly around this tube, such longitudinal edges of the sheet are welded together as indicated by the reference character 62 to effect a cylinder of tantalum sheet wrapped about the tube section 60. During this operation, the end cap indicated generally by the reference character 63 is also held on the steel cap 65 and it likewise is welded to the sheet 61 as indicated by the reference character 64 in FIG. 6.

The tube section 60 may be either the tuge section to which the cylinder formed by the sheet 61 and end cap 63, as shown in FIG. 5, will be ultimately bonded, or it may be a special tube section used for this purpose only. In the former case, the cylinder formed by the sheet 61 and the end cap 63 is removed from the tube section 60 and then this tube section 60 is coated with say from .002 to .005 inch of copper. The two tubes, that is the tube section 60 with copper plating thereon and the tantalum cylinder or tube comprising the welded sheet 61 and the end cap 63 are then re-assembled and inserted in a vacuum furnace at a brazing temperature of about 2000° F. and are then allowed to cool to room temperature.

Since the coefficient of thermal expansion for tantalum is just slightly greater than half that for steel, this technique assures that the two tubes will be held firmly together during the brazing step. That is to say, steel, having the greater coefficient of thermal expansion, will expand to a degree such as to effect a substantial degree of tension in the outer tantalum tube when the two are subjected to the brazing temperature. Naturally, care must be taken that the tantalum is not stretched beyond its elastic limit. From this, it will be apparent that the tantalum sheet will be very firmly compressed upon the steel tube at the brazing temperature and a substantial degree of this compression will be present during the initial cooling step, at which time the brazing compound solidifies so as to, therefore, effect a complete metal-to-metal bond at the interface of the two tubes or cylinders.

Alternatively, the tube 60, which forms the welding jig for the formation of the tantalum cylinder or tube, may be a member specifically utilized for this purpose only. In such case, it is, of course, essential that the tube 60 so used be accurately dimensioned and that the tube ultimately brazed to the tantalum cylinders formed thereon be of accurate dimensions so that the aforementioned metal-to-metal bonding at the interface between the two sheets be effected.

The finished product is illustrated in FIG. 6. In this figure, by way of specific example, the tube section 60 may be a five inch extra heavy carbon steel pipe having a cap 65 welded to one end thereof as indicated by the reference character 66. The tantalum sheet 61 is of the order of 0.008–0.015 inch in thickness and the end cap 63 is of like thickness and may be spun or drawn to the desired shape. After the sheet 61 and end cap 63 are brazed to the tube section 60, the flanges 67 and 68 are added. The flange 67 is of steel and is welded as at 69 directly to the tube 60, whereas the flange 68 is of tantalum of 0.008–0.015 inch thickness having a band portion 70 circumferentially welded as at 71 directly to the tantalum sheet 61.

Thereafter, the assembly indicated generally by the reference character 72 is welded as at 73 to the tube section 60, thus completing the fabrication of the assemblage. The assembly 72 is prefabricated preferably so that the entire assemblage thereof is preformed and ready to be welded at 73 to the associated tube 60.

The steel inlet tube 74, which forms part of the assemblage 72, may be supported adjacent its open end 75 by means of an apertured plate 76 welded as at 77 to the inside of the tube section 60 and affixed therein before the cap 65 is welded thereto.

The method as set forth hereinabove in relation to FIGS. 5 and 6 lends itself quite readily to semi-mass production. For example, the method, it will be appreciated, permits the steam head assembly 72 to be prefabricated separately and, as mentioned hereinabove, a dummy steel tube may be employed as a welding jig for the tantalum sleeves and attached end caps. In this manner, the fabrication of the individual assemblages may be effected more rapidly so long as the proper tolerances are maintained throughout the production run.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

We claim:

1. The method of fabricating heating tubes useful for acid concentrators which comprises first forming a closed hollow mild steel elongate tubular member, forming an inlet and an outlet in said member at one end thereof, applying brazing compound upon a portion of the outer surface of said member including one outer end surface thereof remote from said inlet and said outlet, inserting the coated end of the member into a thin-walled tantalum tubular envelope closed at one end thereof, heating the envelope and member so as to effect a tension upon the envelope to draw the same onto the member and maintaining the heat at sufficient temperature as to fuse the brazing compound and thus join the envelope and member.

2. The method of fabricating heating tubes useful for acid concentrators which comprises first forming a closed hollow mild steel elongate tubular member, forming an inlet and an outlet in said member at one end thereof, applying brazing compound upon a portion of the outer surface of said member including one outer end surface thereof remote from said inlet and said outlet, inserting the coated end of the member into a thin-walled tantalum tubular envelope closed at one end thereof, heating the envelope and member so as to effect a tension upon the envelope to draw the same onto the member and maintaining the heat at sufficient temperature as to fuse the brazing compound and thus join the envelope and member, and simultaneously with the heating of the envelope and member maintaining a vacuum between the envelope and member to withdraw gases from therebetween.

3. The method of fabricating heating tubes useful for acid concentrators which includes the steps of wrapping tantalum sheet about a cylindrical form and welding the longitudinal edges of the sheet together to form a sleeve, and simultaneously providing an end cap for such sleeve, removing the sleeve from the form, coating the outside of a steel sleeve with brazing compound to effect an overall diameter thereof substantially identical to the inside diameter of the tantalum sleeve, assembling the tantalum sleeve upon the coated steel sleeve and then subjecting the thus assembled sleeves to a brazing temperature of about 2000° F. and then permitting the same to cool to room temperature to effect a metal-to-metal bond at the interface of the two sleeves.

4. The method of fabricating heating tubes useful for acid concentrators which comprises welding an end cap on a section of steel tube to form a steel sleeve closed at one end, wrapping tantalum sheet about the steel sleeve and over the major longitudinal extent thereof and fitting a tantalum end cap over the end of the steel sleeve into contacting relationship with the tantalum sheet and with the tantalum sheet having its longitudinal edges disposed closely adjacent each other, welding the longitudinal edges of the tantalum sheet together and welding the tantalum end cap to the tantalum sheet to form a tantalum sleeve closed at one end, withdrawing the tantalum sleeve from the steel sleeve, coating the steel sleeve with a brazing compound to a plate thickness of about 0.001 to 0.006 inch, re-assembling the tantalum sleeve upon the steel sleeve, heating the re-assembled sleeves to a temperature of approximately 2000° F. to expand the steel sleeve within the tantalum sleeve so that the tantalum sleeve effects a compressive force upon the steel sleeve and to liquefy the brazing compound on the steel sleeve, and then permitting the heated sleeves to cool to room temperature whereby the liquefied brazing compound solidifies while the tantalum sleeve is still effecting a compressive force upon the steel sleeve.

5. The method of fabricating heating tubes useful for acid concentrators which comprises welding an end cap on a section of steel tube to form a steel sleeve closed at one end, wrapping tantalum sheet about the steel sleeve and over the major longitudinal extent thereof and fitting a tantalum end cap over the end of the steel sleeve into contacting relationship with the tantalum sheet and with the tantalum sheet having its longitudinal edges disposed closely adjacent each other, welding the longitudinal edges of the tantalum sheet together and welding the tantalum end cap to the tantalum sheet to form a tantalum sleeve closed at one end, withdrawing the tantalum sleeve from the steel sleeve, coating the steel sleeve with copper to a plate thickness of about 0.001 to 0.006 inch, re-assembling the tantalum sleeve upon the steel sleeve, heating the re-assembled sleeves to a temperature of approximately 2000° F. to expand the steel sleeve within the tantalum sleeve so that the tantalum sleeve effects a compressive force upon the steel sleeve and to liquefy the copper plating on the steel sleeve, and then permitting the heated sleeves to cool to room temperature whereby the liquefied copper plating solidifies while the tantalum sleeve is still effecting a compressive force upon the steel sleeve, and thereafter affixing attaching flanges to the joined steel and tantalum sleeves.

6. The method of fabricating heating tubes useful for acid concentrators which comprises welding an end cap on a section of steel tube to form a steel sleeve closed at one end, wrapping tantalum sheet about the steel sleeve and over the major longitudinal extent thereof and fitting a tantalum end cap over the end of the steel sleeve into contacting relationship with the tantalum sheet and with the tantalum sheet having its longitudinal edges disposed closely adjacent each other, welding the longitudinal edges of the tantalum sheet together and welding the tantalum end cap to the tantalum sheet to form a tantalum sleeve closed at one end, withdrawing the tantalum sleeve from the steel sleeve, copper plating the steel sleeve to a plate thickness of about 0.001 to 0.006 inch, re-assembling the tantalum sleeve upon the steel sleeve, heating the re-assembled sleeves to a temperature of approximately 2000° F. to expand the steel sleeve within the tantalum sleeve so that the tantalum sleeve effects a compressive force upon the steel sleeve and to liquefy the copper plating on the steel sleeve, and then permitting the heated sleeves to cool to room temperature whereby the liquefied copper plating solidifies while the tantalum sleeve is still effecting a compressive force upon the steel sleeve, separately fabricating a steam head assemblage, and then affixing the separately prefabricated steam head assembly to the open end of the steel sleeve having the tantalum sleeve joined thereto.

7. The method of fabricating heating tubes useful for acid concentrators comprising forming a closed hollow steel elongate tubular member, forming an inlet and an outlet in said member adjacent one end portion thereof, forming an annular collar on said member spaced from said one end portion, applying a layer of brazing compound over the outer surface of said member beyond said collar and remote from said one end portion and over the opposite end portion of the member, providing a thin-walled tantalum tube closed at one end and having a flange at the opposite end thereof, fitting said tantalum tube over said member and bringing said flange up against said coller, positioning an annular collar against said flange and clamping said last-mentioned collar to said first-mentioned collar to provide a circumferentially extending air-tight seal between said flange and said first-mentioned collar, applying a vacuum between said first mentioned collar and said flange and inwardly of said air-tight seal to exhaust gases accumulating between said member and said tube, and simultaneously with the application of said vacuum heating the tube and member so as to effect a tension upon the tube to draw the same onto the member, and maintaining the heat at a sufficient temperature as to fuse the brazing compound and thus join the tube and member.

References Cited by the Examiner
UNITED STATES PATENTS

| 270,452 | 6/83 | McCormick | 113—100 |
| 1,511,056 | 10/24 | Ercanbrack | 165—142 |
| 1,690,684 | 11/28 | Johnson | 29—473.9 X |
| 2,111,791 | 3/38 | Larson | 113—120 |
| 2,713,196 | 7/55 | Brown | 29—198 X |
| 3,032,316 | 5/62 | Kramer | 29—156.8 X |

FOREIGN PATENTS 15,023    1908    Great Britain.

WHITMORE A. WILTZ, *Primary Examiner.*